Inventor
JOHN H. STROOP

Patented July 4, 1950

2,513,377

UNITED STATES PATENT OFFICE 2,513,377

GAS DISPENSING DEVICE WITH PILOT VALVE CONTROLLED OUTLET VALVE

John H. Stroop, New York, N. Y., assignor to Specialties Development Corporation, Bloomfield, N. J., a corporation of New Jersey Application December 23, 1944, Serial No. 569,547

7 Claims. (Cl. 222—3)

1

This invention relates to valves for controlling high pressure fluid media, and particularly to discharge valves for cylinders or containers wherein such media is stored.

More specifically the invention applies to valves of the above mentioned character for extinguishing fires, distending inflatable devices such as life preservers, rafts and the like, dispensing oxygen, and for other applications of pressure fluid media.

An object of the present invention is to provide an improved valve of the above indicated character, particularly as to weight, size, number of parts, cost, ease of manufacture and assembly and effective operation.

Other objects are to simplify the body portion proper of a discharge valve; to provide a novel venting means for a piston and the like; to construct a syphon valve support for positioning a valve spring; to produce a single means including both main and pilot valve elements; to provide a novel attachment between a valve stem and a valve body; to provide a trigger and valve operating means of more effective action for a certain application; and to combine all of these and other features for novel cooperation with each other to render the valve an improvement generally in its class.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for the purpose of illustration and description and is shown in the accompanying drawing, forming a part of the specification, wherein.

Figure 1:
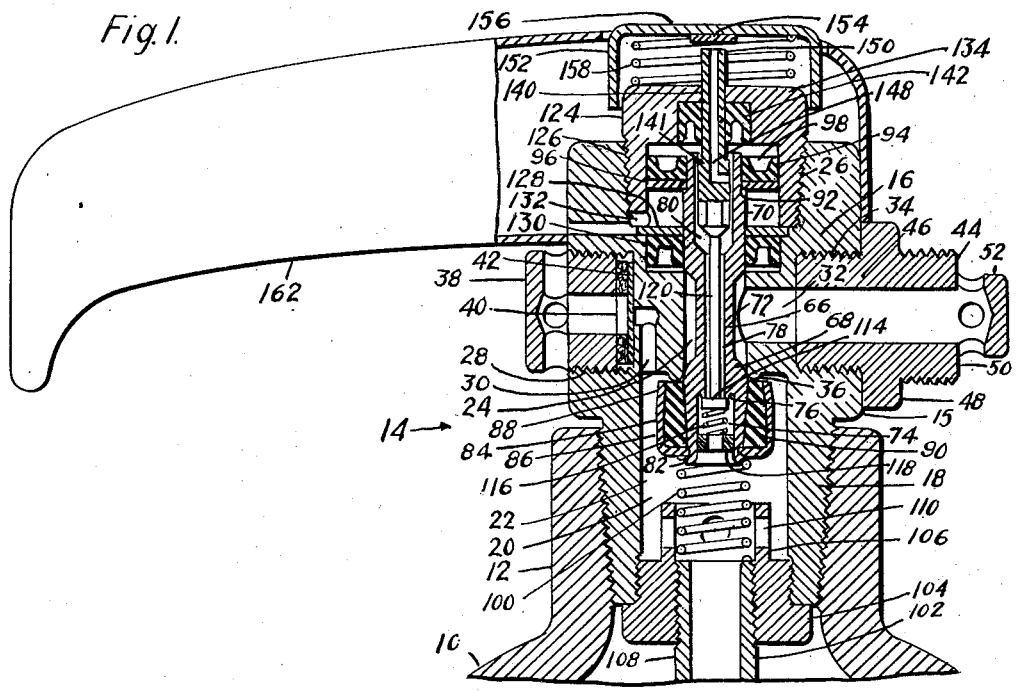
Figure 1 is an enlarged side view, partially in section and partially in elevation, of a valve embodying the invention in one form.

Referring to Figure 1, the device therein shown comprises a container or cylinder 10, of a type employed in fire extinguishers and containing a fluid pressure medium such as carbon dioxide. The cylinder 10 is provided with an outlet neck 12 having a tapered internal screw thread.

A discharge valve or head 14 comprises, in general, a casing 15 including a portion 16, or casing body portion proper, having a tapered exteriorly screw threaded inlet end and mounting portion 18 disposed in the neck 12 of the container, a through bore 20 forming a main valve chamber 22 adjacent to, and partially in, the portion 18, and a conduit 24 extending from the chamber 22 to a recess or cap receiving portion 26 at the other end of the bore 20. The casing body portion 16 further forms a safety discharge side recess 28, communicating with the chamber 22 through a duct 30, a discharge outlet conduit 32 extending from, and transversely to, the conduit 24 to a side recess 34 opening to the exterior of the body, and a main valve seat 36 in the chamber 22 around the entrance to the conduit 24 from the chamber.

A plug 38, screw threaded in the recess 28, holds a gasket 40 against a safety disc 42, which, in turn, is held against the bottom of the recess over the duct 30 by the plug and the gasket.

A coupling 44 has a portion 46 screw threaded to the body 16 in the recess 34, an annular shoulder portion 48, a screw threaded portion 50, and a discharge balancing or anti-recoil portion 52 having right angularly related radial apertures therethrough. The portion 50 is adapted to receive a coupling of a conduit, such as a flexible hose, extending to a fluid dispensing device, such as a discharge horn.

A hollow stem 66, in the conduit 24, has a lower end portion 68 in the chamber 22, and an upper end portion 70 in the recess 26 joined by an intermediate portion 72 of reduced diameter. The lower end portion 68 forms a pilot valve chamber 74 having a valve seat 76 around the entrance to a small bore 78 extending to a large bore 80 in the upper end portion 70. The outer surface of the lower end portion 68 is of substantially frusto-conical shape diverging from a comparatively thin perimetrical edge 62 peened radially outwardly to hold a main valve member 84.

The main valve member 84 comprises a shell 86 of substantially cup-shape having the edges of an aperture at the closed end thereof, held by the edge 82 and edges 88 at the open end of the shell bent radially inwardly to hold a yieldable sealing body 90 in the shell for engaging the seat 36. The upper end portion 70 of the hollow stem 66 has an annular shoulder 92 for a piston head 94, comprising a washer 96 on the shoulder 92 and a slidable packing disc 98 on the washer 96, the washer and the disc being securely held to each other and to the stem 66.

The main valve member 84 is normally maintained in closed position by fluid pressure medium from the container 10 and by a helical spring 100 positioned by a syphon tube structure 102.

The syphon tube structure 102 comprises an intermediate portion 104 secured to the head 14 in the inlet end or mounting portion 18, a short tubular portion 106, of smaller diameter and telescopically receiving the spring 100 which engages, in this instance, a long tubular member or portion 108 extending from the portion 104 to a position close to the bottom of the container 10.

Although, in this instance, the portions 104 and 106 are constructed as a one-piece nut or plug screw threaded to the mounting portion 18 and to the tubular member 108, the structure may be otherwise constituted, as by having the intermediate portion 104 constructed as a simple ring press fitted, or otherwise secured, to the portion 18, and by having the tubular member 108 press fitted or otherwise secured in the ring and extending through the ring to form the short tubular portion 106. The latter, in this case also, has side apertures 110 to facilitate or balance flow of the fluid when the main valve member 64 is open. The spring 100, in this instance, rests on the tubular portion 108, but may telescopically embrace the portion 106, and rest on the portion 104, and be of tapered helical or other shape.

A pilot valve member 114 is disposed in the chamber 74 of the stem 66 in the main valve member 84 and is normally maintained against its seat 76 by the fluid pressure, and by a spring 116 extending between the member 114 and an apertured member 118 press fitted or otherwise secured in the chamber 74 and communicating axially of the stem 66 with the main valve chamber 22.

The pilot valve member 114 has a stem 120 extending from the member 114 entirely through and beyond the outer end of the hollow stem 66, and through the piston head 94, to a position outside the casing body portion 16, and provides for the flow of pressure fluid through the hollow stem 66 to a position above, or at the fluid pressure side of the piston head 94.

A cap member 124 of substantially cup-shape, separate from, and of smaller diameter than the casing body 16, is disposed over the bore 20 with its open end 126 in the recess of receiving portion 26 of the bore and is secured thereto, as by screw threads, by which it presses against a washer 128. The washer 128 presses against a yieldable gasket 130 for slidably sealing the hollow stem 66 at the entrance to the piston cylinder or cap 124 which is provided with a duct 132 venting the main valve side of the piston head in the cylinder to the atmosphere. The outer end 134 of the cup 124 has an aperture 140 and a recess for a sealing gasket 142 through which the pilot valve stem 120 extends to a position outside the cap.

The pilot valve stem 120 has an outer end length 141 of increased diameter in the upper end portion 70 of the hollow stem 66, provided with a duct 148 extending from the fluid pressure side of the piston 94 to the outer end 150 of the stem 120, whereby the end 150 constitutes a tertiary valve seat for the head. A second cup or push button 152, telescoping the end 134 of the cup 124, has a central portion 154 of its closed end 156 constituting a valve member for the tertiary valve seat 150 or outer end of the stem 120. A spring 158 between the cups 124 and 152 normally maintains the valve member or portion 154 away from, or in axially spaced relation to, the tertiary valve seat 150.

A carrying handle 162, for the container 10 and the head 14 as a unit, is attached to the head, and is of such size, shape and position as to facilitate operation of the push button or cap 152.

In operation, when the push button 152 is depressed, a first portion of its movement seats the tertiary valve member 154 against the seat 150, thus closing the duct 148 before the continued movement unseats the pilot valve member 114 from its seat 76 for the flow of the pressure fluid from the container 10, into the main valve chamber, and through the hollow stem 66 to the upper or fluid pressure side of the piston 94 in the cylinder 124. The piston 94 is thereby actuated to push the hollow stem 66 and to consequently unseat the main valve member 84.

Upon the unseating of the main valve member 84, the pressure fluid passes from the main valve chamber 22, through an opening surrounded by the main valve seat 36, and through the conduit 24 to the transverse outlet discharge conduit 32 for passage through the hose or conduit to the horn above mentioned, or for other disposition.

Figure 2:
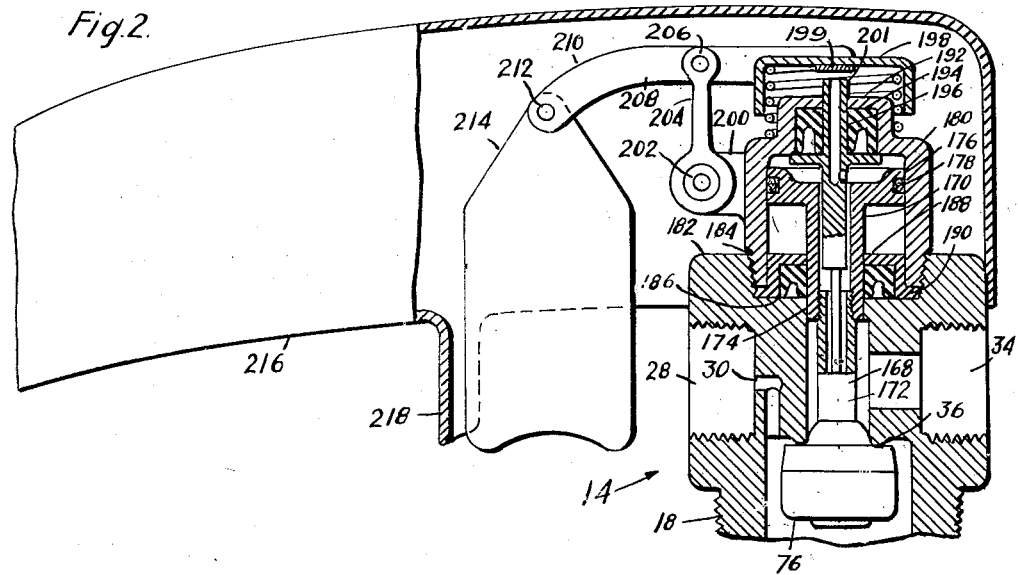
Figure 2 is a view, similar to Figure 1, of a device constructed according to the invention in another form.

Referring to Figure 2 in which corresponding parts are designated by corresponding reference characters, the modification shown is similar to the apparatus above set forth.

A hollow stem 168 in this instance, is constructed of separate upper and lower sections 170 and 172, respectively, the upper end of the lower section 172 of which is screw threadably secured in the lower end of the section 170 to form a joint 174.

A piston head 176 forms an integral part of the upper stem section 170 and has a peripheral groove in which a packing ring 178 is disposed. A cap 180 is secured to a casing body 182 which is similar to the cap 124, but protrudes farther from the casing body 182 than the cap 124 from the body 16. The body 182 has a shallow recess 184 against the bottom of which a packing gasket 186 for the hollow stem 168 is held in a cup-shape member 188 having an annular outer flange 190 against which the open end edge of the cap 180 presses. The cap has a transverse end portion 192, of smaller diameter than the cap sides, in which a packing gasket 194 is disposed for a pilot valve stem 196, and over which a cup 198, corresponding to the cup 152, is disposed. The cup 198 similarly has a center portion 199 constituting a valve member for a tertiary valve seat 201 at the outer end of the pilot valve stem 196.

A lug 200 on a side of the cup 180 partially supports, as by a pin 202, a link 204 which extends upwardly from the lug parallel to the head 14, and has a pin 206 at its upper end in a lever 208 connected at one end to the cup 198. The other end 210 of the lever 208 is connected, as by a pin 212, to a trigger 214 depending from the pin 212.

A carrying handle 216, longer than the handle 162 shown in Figure 1, has a depending guide or backing plate portion 218 for the trigger 214.

When the trigger 214 is moved upwardly, the pivotal or rotative movement of the lever 208 and the link 204 thereby caused, is translated into linear or thrust movement parallel to the axis of the pilot stem 196 for accurately seating the tertiary valve member or portion 199 on the seat 201 at end of the stem 196. Continuing from this seating, the operation is as set forth above for the structure of Figure 1.

From the foregoing description, it will be apparent that various elements of a device of the class indicated have been simplified, reduced in size, weight, cost and number, and recombined for novel cooperation rendering the device more effective, and an improvement generally, in its field.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. A valve for fluid pressure media comprising a casing providing a main valve chamber and a cylinder, a main valve in said chamber, a piston in said cylinder for actuating said main valve, a pilot valve for controlling the flow of pressure fluid to said cylinder, a stem for actuating said pilot valve disposed in a bore of the piston extending to a position outside the casing and providing a vent for said cylinder, a container on which said casing is mounted as a unit therewith and containing said medium, a carrying handle for the unit, a trigger on said handle, means on said handle providing a guide for the trigger and pivoted means between said trigger and said stem for operating the latter and including a vent valve member opposite the end of said stem, said pivoted means being operative for translating movement of said trigger through said pivoted means into rectilinear movement of said vent valve member and said stem to close said vent and open said pilot valve.

2. A discharge valve head for a fluid pressure medium comprising a casing having a main valve chamber provided with axially aligned inlet and outlet portions and a main valve seat around said outlet portion, a main valve member for said seat including an element forming a pilot valve chamber communicating between said main valve chamber and a hollow stem in said outlet through a pilot valve seat in the pilot valve chamber, a yieldable main valve seating body surrounding said element, a cup-like shell enclosing said body, a peripheral end edge of said element being radially outwardly peened to form a shoulder holding said shell and yieldable body in position, and a pilot valve member in said pilot valve chamber.

3. In combination in a self-contained unit, a container for a fluid pressure medium, a discharge valve head comprising a casing body secured to, and enclosing a main valve member controlling fluid from, the container and forming a pilot valve chamber, a cup having its open end in the body and constituting a piston cylinder, a piston in said cylinder connected to said main valve member through a hollow stem providing communication between said pilot chamber and the pressure side of said piston, a pilot valve member, a spring normally seating said pilot member, a spring normally seating said main valve member, a syphon tube structure between said head and the container having an intermediate portion secured in the head and a tubular portion of smaller diameter telescoping and supporting said second spring, a stem on said pilot valve member extending through said hollow stem and through the closed end of said cup and having a vent duct from the pressure side of said piston to the outer end of said pilot stem, a second cup over said first cup having a portion for closing said duct, a spring in said second cup biasing the same away from said first cup.

4. A valve for fluid pressure media comprising a casing providing a main valve chamber and a cylinder, a main valve in said chamber, a piston in said cylinder for actuating said main valve, a hollow stem connecting said piston and valve and communicating with said chamber, a pilot valve for controlling the flow of pressure fluid to said cylinder through said hollow stem to the pressure side of the piston, an operating stem in said hollow stem for actuating said pilot valve and having a duct in communication with said hollow stem for venting said hollow stem and cylinder at the pressure side of the piston and extending to a position outside said casing, a cup-shaped member movable to telescope the upper end of the casing and the upper end of said operating stem, a valve member carried by said cup-shaped member for closing said duct, and resilient means normally retaining said last named valve member in open position.

5. A valve for fluid pressure media comprising a casing providing a main valve chamber and a cylinder, a main valve in said chamber and having a pilot valve recess formed therein, a piston in said cylinder for actuating said main valve, a hollow stem connecting said piston and valve and communicating with said chamber, a pilot valve in said recess for controlling the flow of pressure fluid to said cylinder through said hollow stem to the pressure side of the piston, spring means supported within said recess normally retaining the pilot valve closed, an operating stem in said hollow stem for actuating said pilot valve and having a duct in communication with said hollow stem for venting said hollow stem and cylinder at the pressure side of the piston and extending to a position outside said casing, a cup-shaped member movable to telescope the upper end of the casing and the upper end of said operating stem, a valve member carried by said cup-shaped member for closing said duct, and resilient means normally retaining said last named valve member in open position.

6. A valve for fluid pressure media comprising a valve body provided with a main valve chamber and a cylinder, a main valve in said chamber, a piston in said cylinder, a hollow stem connecting said piston and said main valve and establishing communication between said main valve chamber and said piston cylinder, a pilot valve adjacent to and seating on said main valve operable to control the communication through said hollow stem between said main valve chamber and the piston cylinder, an operating stem in said hollow stem for actuating said pilot valve, said operating stem being provided with a duct establishing communication between the piston cylinder at the pressure side of the piston and the atmosphere, an operating member pivotally mounted on the valve body and adapted to depress the operating stem to unseat the pilot valve, and resilient means normally tending to move the operating member out of contact with the operating stem, whereby upon actuation of the operating member to depress the operating stem fluid under pressure will pass from the main valve chamber through the hollow stem to the piston cylinder and effect actuation of the main valve member, while upon release of the operating member the pressure in the piston cylinder will be vented through said duct to the atmosphere, whereupon the main valve member and the pilot valve member will be returned to their normally closed positions.

7. A valve for fluid pressure media comprising a valve body provided with a main valve chamber and a cylinder, a main valve in said chamber, a piston in said cylinder, a hollow stem connecting said piston and said main valve and establishing communication between said main valve chamber and said piston cylinder, a pilot valve adjacent to and seating on said main valve operable to control the communication through said hollow stem between said main valve chamber and the piston cylinder, an operating stem in said hollow stem for actuating said pilot valve, said operating stem extending above the upper end of said valve body and being provided at its upper end with a duct opening through the upper end of the operating stem and establishing communication between the piston cylinder at the pressure side of the piston and the atmosphere, an operating member pivotally mounted on the valve body and adapted to depress the operating stem to unseat the pilot valve and to close off communication between said duct and the atmosphere while the operating stem is depressed, and resilient means normally tending to move the operating member out of contact with the operating stem, whereby upon actuation of the operating member to depress the operating stem fluid under pressure will pass from the main valve chamber through the hollow stem to the piston cylinder and effect actuation of the main valve member, while upon release of the operating member the pressure in the piston cylinder will be vented through said duct to the atmosphere and the main valve member and the pilot valve member will be returned to their normally closed positions.

JOHN H. STROOP.

REFERENCES CITED

The following references are of record in the file of this patent:

UNITED STATES PATENTS

| Number | Name | Date |
|---|---|---|
| 312,077 | Bowen | Feb. 10, 1885 |
| 521,644 | Desmond | June 19, 1894 |
| 604,358 | Alexander | May 24, 1898 |
| 932,497 | Richman | Aug. 31, 1909 |
| 1,233,856 | Elder | July 17, 1917 |
| 1,750,317 | Hope | Mar. 11, 1930 |
| 2,172,142 | Lebus | Sept. 5, 1939 |
| 2,258,869 | Towart | Oct. 14, 1941 |
| 2,268,733 | Williams | Jan. 6, 1942 |
| 2,273,756 | Freygang | Feb. 24, 1942 |
| 2,319,907 | Stirling | May 25, 1943 |
| 2,361,225 | Meyer | Oct. 24, 1944 |

FOREIGN PATENTS

| Number | Country | Date |
|---|---|---|
| 8,906 | France | May 12, 1908 |
| 14,638 | Great Britain | July 15, 1905 |
| 141,017 | France | Feb. 8, 1881 |
| 419,737 | Great Britain | Nov. 19, 1934 |